United States Patent
Rideout et al.

(10) Patent No.: US 8,768,121 B2
(45) Date of Patent: Jul. 1, 2014

(54) PHOTONIC FILTERING OF ELECTRICAL SIGNALS

(75) Inventors: Howard Rideout, St. John's (CA); Joe Seregelyi, Ottawa (CA); Ping Lu, Ottawa (CA); Stéphane Paquet, Gatineau (CA); Jianping Yao, Ottawa (CA); Stephen J. Mihailov, Ottawa (CA); John Oldham, Ottawa (CA); Mario Caron, Gatineau (CA)

(73) Assignee: Her Majesty the Queen in Right of Canada, as Represented by the Minister of Industry, Through the Communications Research Centre Canada, Ottawa (CA)

( * ) Notice: Subject to any disclaimer, the term of this patent is extended or adjusted under 35 U.S.C. 154(b) by 975 days.

(21) Appl. No.: 12/719,200

(22) Filed: Mar. 8, 2010

(65) Prior Publication Data

US 2010/0230621 A1   Sep. 16, 2010

Related U.S. Application Data

(60) Provisional application No. 61/158,792, filed on Mar. 10, 2009.

(51) Int. Cl.
| | |
|---|---|
| G02B 6/34 | (2006.01) |
| G02F 1/035 | (2006.01) |
| G02B 6/42 | (2006.01) |
| H03H 7/00 | (2006.01) |
| H01P 1/20 | (2006.01) |
| G02B 27/09 | (2006.01) |
| G02F 1/01 | (2006.01) |

(52) U.S. Cl.
CPC ............ G02F 1/01 (2013.01); *H04B 2210/006* (2013.01); *G02F 2201/307* (2013.01); *G02F 2203/055* (2013.01); *G02F 2201/16* (2013.01)

USPC ...... 385/37; 385/2; 385/27; 385/39; 333/167; 333/185; 333/202; 250/551

(58) Field of Classification Search
USPC ........... 385/1–5, 8, 10, 14, 27, 28, 31, 37, 39, 385/49–50; 333/167, 185, 202; 250/551
See application file for complete search history.

(56) References Cited

U.S. PATENT DOCUMENTS

| | | | |
|---|---|---|---|
| 5,579,143 A | 11/1996 | Huber | 398/72 |
| 5,615,289 A | 3/1997 | Duck et al. | 385/24 |

(Continued)

FOREIGN PATENT DOCUMENTS

EP   1324104   2/2003   ............... G02F 1/11

OTHER PUBLICATIONS

Blais et al., "Tunable Photonic Microwave Filter Using a Superstructured FBG with Two Reflection Bands Having Complementary Chirps", IEEE Photonics Technology Letters, vol. 20, No. 3, pp. 199-201, Feb. 1, 2008.*

(Continued)

*Primary Examiner* — Uyen Chau N Le
*Assistant Examiner* — Michael Mooney
(74) *Attorney, Agent, or Firm* — Teitelbaum & MacLean; Neil Teitelbaum; Doug MacLean (57) ABSTRACT

A filter and a method of filtering a high frequency electrical signal using photonic components is disclosed. The filter has a serially fiber-coupled laser source, a modulator, a filter, and a photodetector. The electrical signal is applied to the modulator. The modulated light propagates through the filter which is constructed to pass not only a modulated sideband, but also at least a fraction of light at the carrier frequency of the laser. The photodetector detects a signal at the beat frequency between the carrier and sideband signals, after both signals have propagated through the filter. As a result, a separate optical branch for light at the carrier frequency is not required, which considerably simplifies the filter construction and makes it more stable and reliable.

11 Claims, 6 Drawing Sheets

(56) References Cited

U.S. PATENT DOCUMENTS

| | | | |
|---|---|---|---|
| 5,638,473 A | 6/1997 | Byron | 385/37 |
| 5,778,119 A | 7/1998 | Farries | 385/37 |
| 6,304,689 B1 | 10/2001 | Dingel et al. | 385/24 |
| 6,363,202 B1 * | 3/2002 | Goodfellow | 385/140 |
| 6,654,521 B2 | 11/2003 | Sheng et al. | 385/37 |
| 6,707,967 B2 | 3/2004 | Rothenberg et al. | 385/37 |
| 6,766,116 B2 | 7/2004 | Webb | 398/196 |
| 6,816,650 B2 | 11/2004 | Yeralan et al. | 385/37 |
| 7,024,069 B2 | 4/2006 | Savchenkov et al. | 385/15 |
| 7,116,907 B1 | 10/2006 | Nakazawa et al. | 398/85 |
| 7,177,545 B2 | 2/2007 | Frignac et al. | 398/85 |
| 7,269,312 B2 | 9/2007 | Ng et al. | 385/27 |
| 7,362,927 B1 | 4/2008 | Ilchenko et al. | 385/15 |
| 7,386,204 B1 | 6/2008 | Davis et al. | 385/37 |
| 7,389,053 B1 | 6/2008 | Ilchenko et al. | 398/183 |
| 2002/0075546 A1 | 6/2002 | Webb | 398/182 |
| 2004/0208624 A1 * | 10/2004 | Fathallah et al. | 398/161 |
| 2005/0074200 A1 | 4/2005 | Savchenkov et al. | 385/15 |
| 2005/0175358 A1 | 8/2005 | Ilchenko et al. | 398/198 |
| 2007/0110453 A1 * | 5/2007 | Akiyama et al. | 398/182 |
| 2007/0217737 A1 | 9/2007 | Gill et al. | 385/27 |

OTHER PUBLICATIONS

Yi et al., "Microwave photonic filter with single bandpass response", *IEEE Xplore, Electronic Letters*, vol. 45, No. 7, pp. 362-363, Stevenage UK, Jan. 16, 2009.

Yan et al., "Tunable Photonic Microwave Bandpass Filter With Negative Coefficients Implemented Using an Optical Phase Modulator and Chirped Fiber Bragg Gratings", *Journal of Lightwave Technology, IEEE*, vol. 25, No. 11, pp. 3283-3288, New York, Nov. 1, 2007.

Wang et al., "Chirped Microwave Pulse Compression Using a Photonic Microwave Filter With a Nonlinear Phase Response", *IEEE Transactions on Microwave Theory and Techniques*, vol. 57, No. 2, pp. 496-500, New York, Feb. 1, 2009.

Ming Yu et al., "A Ka Band Tunable Filter for Reconfigurable Payload", *15th Ka and Broadband Communications, Navigation and Earth Observation Conference*, Sep. 23-25, 2009.

Glyn Thomas et al., "Agile Equipment for an Advanced Ku/Ka Satellite", *ESA Workshop on Advanced Flexible Telecom Payloads*, Nov. 18-20, 2008, *ESA/ESTEC*, Noordwijk, The Netherlands.

Raman Kashyap, "Fiber Bragg Gratings", *Academic Press*, ISBN 0-12-400560-8, 1999.

\* cited by examiner

PHOTONIC FILTERING OF ELECTRICAL SIGNALS

CROSS-REFERENCE TO RELATED APPLICATIONS

The present invention claims priority from U.S. provisional patent application No. 61/158,792, filed Mar. 10, 2009, which is incorporated herein by reference.

TECHNICAL FIELD

The present invention relates to signal filtering, and in particular to photonic filtering of electrical signals.

BACKGROUND OF THE INVENTION

Communication satellites operating in the Ka-band frequency range often use a large number of microwave communication beams. The satellites typically have a lifetime of over 15 years. It is rather difficult to predict the information carrying capacity of individual beams during such a long period of time. Accordingly, dynamic allocation of the bandwidth among the microwave communication beams is highly desirable.

The dynamic bandwidth allocation can be provided by tunable microwave filters having a tunable central frequency and a variable width of the passband. Such tunable microwave filters can be installed in both the ground stations and onboard the satellites. To be practically usable, the tunable filters must possess a high stability of the spectral response, strong out-of-band rejection, and small group delay variation. Furthermore, tunable filters placed on satellites must be lightweight and meet stringent space-launch qualification requirements.

Electronic filters are ubiquitous in circuit design. Many types of electronic filters are presently available. The most common filters use bulk elements, such as capacitors, inductors, and so on, to form single- or multi-pole filters at appropriate frequencies of interest. It is possible to build tunable filters using switching banks or variable components. Although these filters can operate up to several gigahertz in frequency, they are mostly used for lower frequencies, where the physical dimensions of the components are still small compared to the wavelength of operation.

Circuits operating at microwave frequencies typically use planar or coaxial waveguide structures. These filters utilize distributed capacitance and inductance created by a particular geometry of the waveguide structure, in conjunction with the abrupt variations in impedance created by stubs and slots, to form resonant cavities. Using ceramic materials or high-temperature superconductors to form very low loss substrates can result in very high finesse (high-Q) filters. Planar structures are reasonably easy to fabricate using conventional circuit board techniques. However, the circuit board based planar structures tend to be lossy at higher frequencies due to radiative loss. Coaxial structures are superior in this regard because the outer conductor shields the structure, but these tend to be bulky and heavy.

Millimeter-wave filters can be formed using dielectric resonators and cavity structures, but they are difficult to fabricate, and the resulting filter characteristics can be very sensitive to fabrication errors, particularly when the filters contain multiple coupled resonators. Both the microwave and the millimeter-wave filters are difficult to tune and have a limited tuning range. Furthermore, it is difficult to change the finesse of a particular filter or to generate a variable bandwidth filter.

In a satellite, a bank of filters is switched in and out of a signal path to change the channel bandwidth, and a programmable frequency converter is used to change the center frequency. There are two major difficulties associated with this approach. First, a very limited number of filters can be practically used due to a large number of communication beams, and even these few filters per beam result in a very heavy and bulky overall structure. Second, once the set of filters is determined, it remains fixed for the lifetime of the satellite. Because of these intrinsic difficulties, other approaches have been investigated.

One such approach, presented by Ming Yu el al. in a paper entitled "A Ka Band Tunable Filter for Reconfigurable Payload", 15th Ka and Broadband Communications, Navigation and Earth Observation Conference, Sep. 23-25, 2009, which is incorporated herein by reference, consists of having a mechanically tunable cavity filter. However, any mechanically controlled devices or subsystems in a satellite raise substantial reliability issues.

Another approach, exemplified in a paper by Glyn Thomas et al. entitled "Agile Equipment for an Advanced Ku/Ka Satellite", ESA Workshop on Advanced Flexible Telecom Payloads, 18-20 Nov. 2008, ESA/ESTEC, Noordwijk The Netherlands, which is incorporated herein by reference, uses an electrical heterodyne principle. The signal is frequency down-converted to a given intermediate frequency (IF) using a programmable synthesizer, two cascaded bandpass filters are used to achieve the required filtering, and then another programmable synthesizer is used to bring the signal to the desired channel frequency. The main drawbacks of this circuit are the power consumption, and large volume and mass, which are all very detrimental for a space application.

Electrical filters based on photonic circuits have been reported numerous times, primarily in the academic literature. These are generally based on: tapped delay lines to emulate a finite impulse response (FIR) filter, delay line interferometers, fiber Bragg grating (FBG) delay lines, dispersive fiber delays, and acousto-optic modulators. In general, these techniques are better suited towards forming notch filters, not bandpass filters required for a satellite bandwidth allocation and tuning applications.

Figure 1:
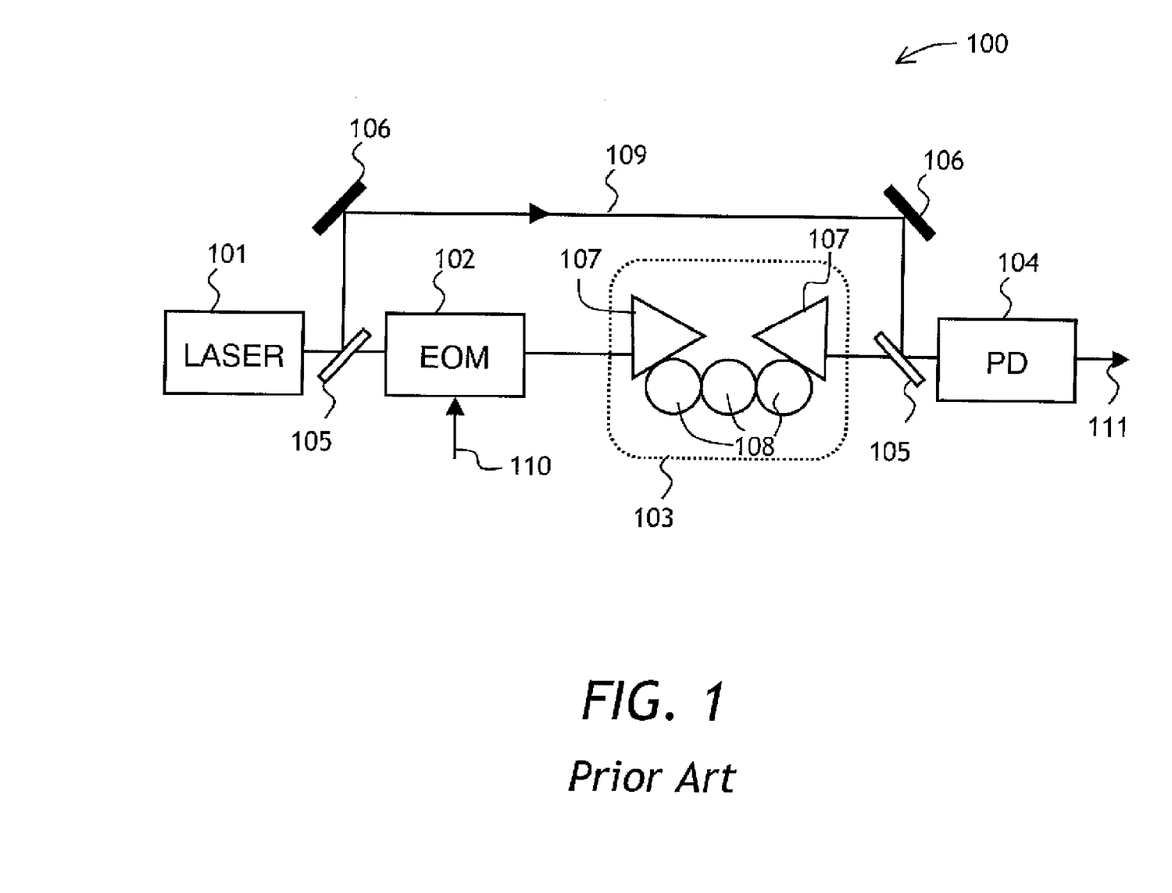
FIG. 1 is a schematic view of a prior-art optical filter used for filtering electrical signals.

Ilchenko et al. disclose in United States Patent Application US2005/0175358, which is incorporated herein by reference, a tunable radio frequency and microwave photonic filter using an optical heterodyne principle. Referring to FIG. 1, a filter 100 of Ilchenko et al. is shown having a laser 101, an electro-optical modulator (EOM) 102, a whispering-gallery mode (WGM) filter 103, a photodetector 104, beamsplitters 105, and mirrors 106. The WGM filter 103 has evanescent field couplers 107 and cascaded WGM resonators 108. In operation, the laser 101 emits a beam at a carrier frequency that is modulated by the EOM 102 with a radio frequency input signal 110 to create sidelobes in a spectrum of the optical signal. The WGM filter 103 selects one such sidelobe. A fraction of the laser beam is split by the beamsplitter 105 before the EOM 102 to propagate through a path 109 defined by the beamsplitters 105 and the mirrors 106. The photodetector 104 receives the combined modulated and the split laser beam and provides an output electrical signal 111 at a differential frequency between the passband frequency of the filter 103 and the carrier frequency. By tuning the WGM filter 103, the passband central frequency of the filter 100 can be tuned.

The filter of Ilchenko et al. suffers from the drawbacks of overall complexity and lack of stability due to presence of multiple optical elements and optical paths.

Accordingly, it is a goal of the present invention to provide a filter of a millimeter-wave or microwave signal, which would be lightweight, simple, reliable, and tunable in both central frequency and bandwidth.

SUMMARY OF THE INVENTION

Advantageously, the present invention does not require multiple optical paths for downshifting the carrier frequency back into the electrical domain, resulting in a reliable, simple, widely tunable filter of electrical signals using optical filtering elements.

In accordance with the invention there is provided a filter for filtering an electrical signal, comprising:

- an optical modulator for receiving light at a carrier frequency and for modulating light at a frequency of the electrical signal;
- an optical filter coupled to the optical modulator, for receiving the modulated light and for selecting light at a first frequency to propagate therethrough with at least a fraction of light at the carrier frequency; and
- a photodetector coupled to the optical filter, for detecting a signal at a beat frequency between the first frequency and the carrier frequency,
- wherein the detected signal at the beat frequency comprises an output signal of the filter.

Preferably, the electrical filter is tunable by tuning at least one of the first frequency of the optical filter or the carrier frequency of light. In one embodiment, the optical filter includes a dual-band optical filter having a first passband for light at the first frequency and a second passband for light at the carrier frequency.

In one embodiment, the dual-band optical filter has first and second optical sub-filters connected in series, the first and the second optical sub-filters each having first and second passbands. The first passband of the dual-band optical filter comprises an overlap region between the first passbands of the first and the second optical sub-filters, and the second passband of the dual-band optical filter comprises an overlap region between the second passbands of the first and the second optical sub-filters. As a result, a central frequency and/or a bandwidth of the first passband of the optical filter is tunable by tuning a central frequency of the first passband of the first optical sub-filter, of the second optical sub-filter, or of both the first and the second optical sub-filters, whereby the filter for filtering the electrical signal is tunable in frequency and/or bandwidth.

Preferably, the electrical filter also includes a light source for providing light at the carrier frequency. The light source can be directly modulated, in which case a separate optical modulator will not be required.

In accordance with another aspect of the invention there is further provided a filter for filtering an electrical signal, comprising:

- a first source of light at a carrier frequency modulated at a frequency of the electrical signal; and
- an optical filter coupled to the first source of light, for receiving the modulated light and for selecting light at a first frequency to propagate therethrough with at least a fraction of light at the carrier frequency, for subsequent conversion into an output electrical signal at a beat frequency between the first frequency and the carrier frequency.

The first source of light can be a directly modulated light source, such as a directly modulated laser source, for emitting light at the carrier frequency modulated at the frequency of the electrical signal. Alternatively, the first source of light can be an optical modulator for receiving light at the carrier frequency from an external laser source and for modulating light from that source at the frequency of the electrical signal.

In accordance with yet another aspect of the invention there is provided a method of filtering an electrical signal, comprising:

(a) providing an optical signal at a carrier frequency;
(b) modulating the optical signal of step (a) at a frequency of the electrical signal, so as to generate a modulated optical signal having a sidelobe frequency band;
(c) filtering the optical signal modulated in step (b) using an optical filter having a first passband for passing light at a first frequency within the sidelobe frequency band, and a carrier passband for passing light at the carrier frequency; and
(d) detecting a signal at a beat frequency between the optical signals filtered in step (c).

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
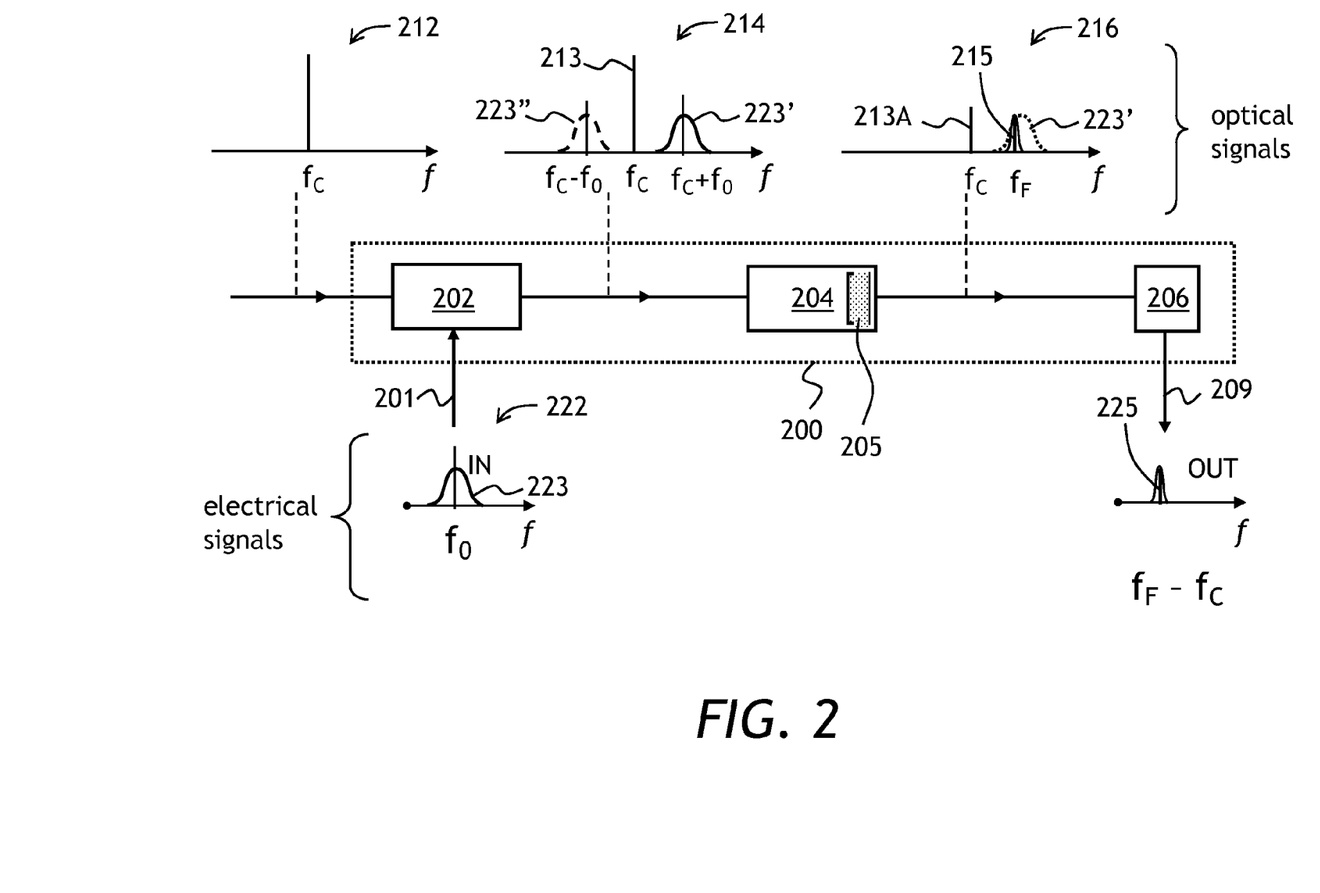
FIG. 2 is a diagrammatic view of a filter according to the present invention, illustrating the principle of operation of the filter.

Referring to FIG. 2, a diagrammatic view of a filter 200 of the present invention is shown. The filter 200 has an optical modulator 202 for receiving light at a carrier frequency $f_C$ and for modulating the received light with an input electrical signal 201 represented by a spectral band 223 centered at a frequency $f_O$; an optical filter 204 coupled to the optical modulator 202, for receiving the modulated light and for filtering light at a filtering frequency $f_F$; and a photodetector 206 coupled to the optical filter 204, for detecting light at a beat frequency between the filtering and carrier frequencies $f_F$ and $f_C$.

In operation, an optical signal at the carrier frequency $f_C$ is provided to the modulator 202. The frequency spectrum of the optical signal is shown at 212. The modulator 202 modulates the optical signal with the input electrical signal 201. The frequency spectrum of the input electrical signal 201 is shown at 222. The input spectrum 222 has the spectral band 223 centered at $f_0$. The spectral band 223 has a finite bandwidth.

The modulated optical spectrum is shown at 214. It has a signal 213 at the carrier frequency $f_C$ and sidelobe frequency bands 223', 223", which resemble the spectral band 223 of the electrical signal and are centered at $f_C+f_0$ and $f_{C-f0}$, respectively. Depending on type of modulation, only one sidelobe frequency band 223' may be present in the spectrum 214. If both sidelobes are present, the frequency band 223" can be suppressed by an appropriate notch filter 205, included into the optical filter 204. Alternatively, the signal at 223" can be retained while the signal at 223' is suppressed. For the sake of the following example, the signal at 223' is retained.

The optical filter 204 passes light at the filtering frequency $f_F$. Furthermore, according to the invention, the optical filter 204 also passes at least a fraction of light at the carrier frequency $f_C$ to propagate therethrough together with light at the filtering frequency $f_F$, obviating a general requirement of the prior art to have a separate optical branch for light at the carrier frequency $f_C$. It is to be understood that the bandwidth of the filter 204, although narrow, is a finite bandwidth.

The optical spectrum of the signal after the optical filter 204 is shown at 216. It has a signal 215 at the filtering frequency $f_F$ and a signal 213A at the carrier frequency $f_C$. The rest of the spectral shape represented by the sidelobe 223' is filtered out, or suppressed. It is to be understood that the signal 215 at the filtering frequency $f_F$ is of a finite, although narrow, bandwidth.

The optical signal represented by the spectrum 216 is detected by the photodetector 206. The electric fields of the signals at frequencies $f_C$ and $f_F$ will interfere at a photosensitive surface of the photodetector 206, resulting in an electrical signal 225 at a beat frequency $f_F-f_C$ appearing at an output 209 of the filter 200. As is known to one of skill in the art, the beat frequency signal appears because a photodetector signal is proportional to light intensity, which is proportional to square of the electric field. The detected signal at the beat frequency comprises an output signal of the filter.

By tuning the differential frequency $f_{F-fC}$, the filter 200 may be tuned in frequency. From a practical standpoint, at least one of the filter frequency $f_F$ of the optical filter 204 or the carrier frequency of light $f_C$ needs to be tuned relative to the other frequency for the filter 200 to be tuned.

Figure 3:
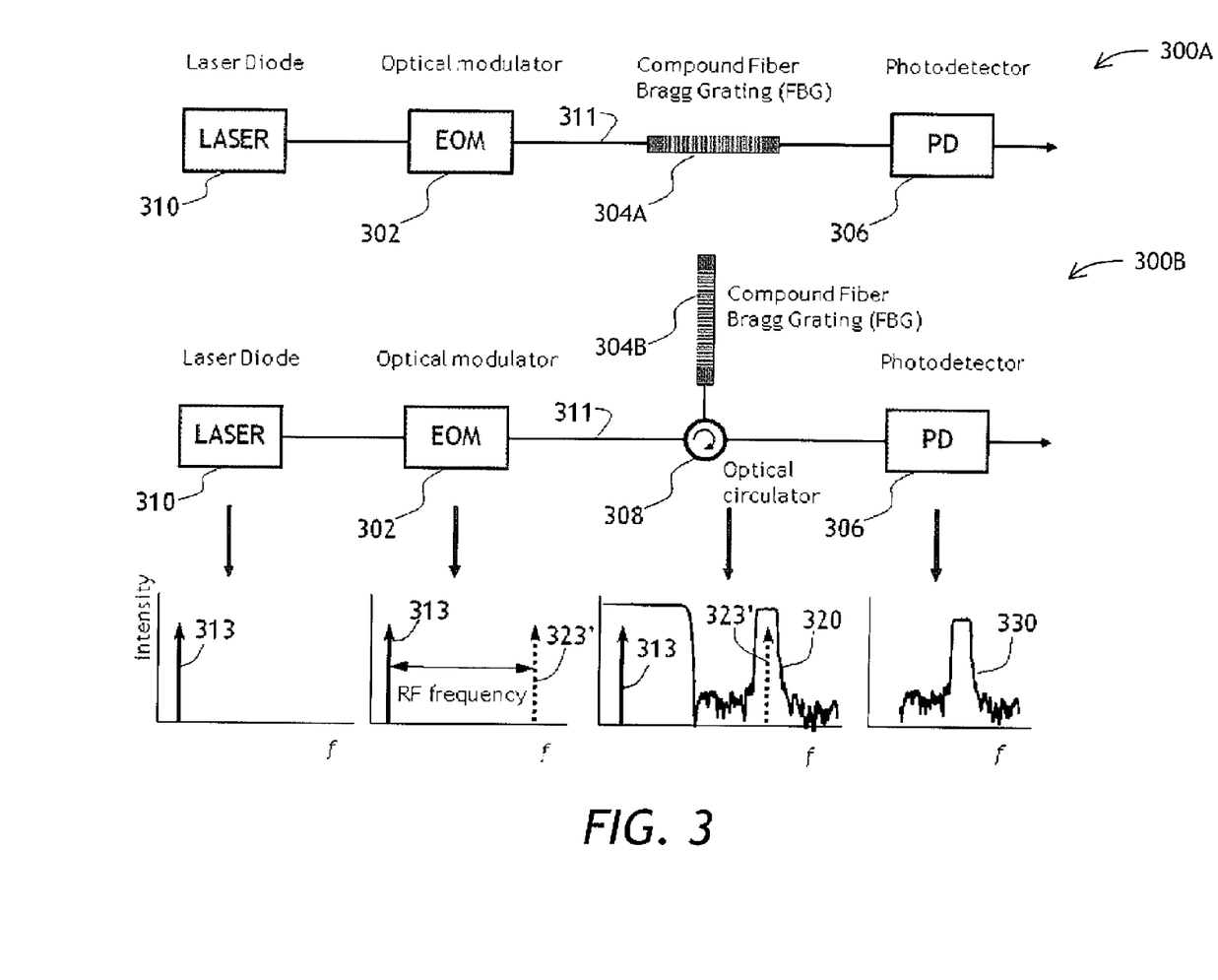
FIG. 3 is a diagrammatic view of filters of the present invention, showing spectra of signals propagating through the filters.

Referring now to FIG. 3, a diagrammatic view of filters 300A and 300B of the present invention is shown. The filters 300A and 300B are particular implementations of the filter 200 of FIG. 2. Similar numerals in FIGS. 2 and 3 refer to similar elements. The filter 300A uses a fiber Bragg grating (FBG) 304A in transmission, while the filter 300B uses an FBG 304B in reflection. An optical circulator 308 is incorporated into the optical path of the filter 300B having the reflection FBG 304B. A beamsplitter, not shown, can be used instead of the optical circulator 308.

The filters 300A and 300B of FIG. 3 have a laser diode 310 for emitting light at the carrier frequency $f_C$, an optical modulator 302 for receiving light from the laser 310 and for modulating light with an input electrical signal, the FBGs 304A and 304B, respectively, coupled to the optical modulator 302, for receiving the modulated light and for filtering light, and a photodetector 306 coupled to the FBGs 304A and 304B, respectively, for detecting a signal at a beat frequency between the frequencies of the filtered light. The signal detected by the photodetector 306 is the output electrical signal of the filters 300A and 300B.

The FBGs 304A and 304B have an optical response function 320. In the transmission FBG 304A this response function 320 is the transmitted response, and in the reflection FBG 304B this response function 320 is the reflected response. The laser diode 310, the optical modulator 302, the FBGs 304A and 304B, and the photodetector 306 are optically coupled with an optical fiber 311 as shown in FIG. 3.

In general, to characterize a spectral response of an electrical filter, a frequency-swept electrical signal is applied to the filter input, and an output electrical signal is measured. The output electrical signal plotted against the frequency of the swept signal represents the response function of the filter being characterized. Accordingly, to obtain a spectral response of the filters 300A or 300B, a frequency-swept electrical signal can be applied to the modulator 302. As a result of modulation, a component 323' appears in the optical spectrum of the signal at the output of the modulator 302. The separation between the component 323' and a signal 313 at the carrier frequency $f_C$ corresponds to the frequency of modulation by the modulator 302.

The signal is filtered by the FBGs 304A or 304B having the spectral response 320. Both signals 313 and 323' co-propagate through the FBGs 304A or 304B. As mentioned previously, the other sideband 223" is suppressed. At the detector 306, the optical signals interfere with each other to generate an signal at a beat frequency therebetween. As the electrical signal is swept in frequency, the component 323' is shifted relative to the carrier frequency component 313, resulting in attenuation of the component 323' by the FBGs 304A or 304B when the component 323' shifts beyond the passband of the optical attenuation spectrum 320 of the FBGs 304A or 304B. The output electrical signal at the photodetector plotted against the frequency of the swept signal will form a spectral response 330 corresponding to the optical attenuation spectrum 320 of the FBGs 304A or 304B. Therefore, by adjusting the optical attenuation spectrum 320, one can adjust the electrical response function 330 of the filters 300A or 300B.

The compound FBGs 304A or 304B are tunable by tuning their temperature, or by stress-tuning, or by tuning any other suitable parameter thereof. The FBGs 304A and 304B may be superstructure gratings, multi-phase shift gratings, and/or chirped gratings. These types of gratings are described by Raman Kashyap in a book entitled "Fiber Bragg Gratings", Academic Press, ISBN 0-12-400560-8, 1999, which is incorporated herein by reference. In particular, FIGS. 3.24, 6.5 and 7.1 of the above reference show the above stated respective types of the gratings. Other types of gratings can also be used, with or without apodization, including gratings in planar waveguides.

The laser diode 310 can be a distributed-feedback (DFB) laser. DFB lasers are frequency tuned by tuning the laser temperature using a thermoelectric cooler (TEC), not shown. Thus, by adjusting the temperature of the TEC, the filters 300A and 300B can be tuned in frequency. Alternatively, the laser diode 310 can have an external FBG serving as a mirror of the lasing cavity of the laser diode 310. The laser FBG, not shown, can also be temperature tuned. The laser diode 310 can be modulated directly, in which case no optical modulator 302 will be required.

Furthermore, the filters 300A and 300B, or the filter 200 for that matter, can be implemented using a planar waveguide technology. For example, the optical modulator 202, the optical filter 204, and the detector 206 can be implemented on a common planar substrate, coupled by a planar optical waveguide. Integrating the filter 200 of FIG. 2 using planar waveguide technology may further improve the stability and manufacturability of the filter 200.

Figure 4:
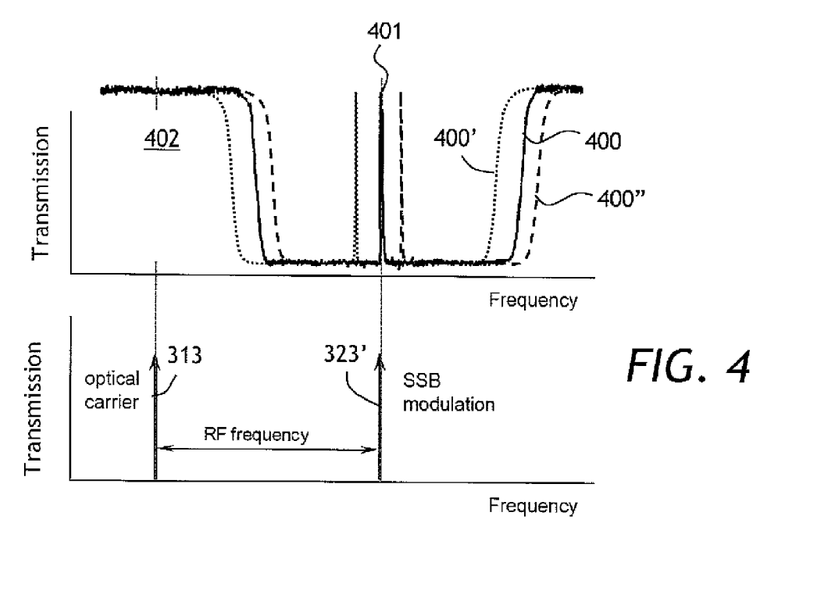
FIG. 4 is a transmission spectrum of a fiber Bragg grating (FBG) having two transmission bands.

Turning now to FIG. 4, a measured transmission spectrum 400 of the FBG 304A of FIG. 3 is shown. The spectrum 400 has two passbands 401 and 402. The first passband 401 is for filtering light at the sidelobe frequency 323', and the second passband 402 is for passing the carrier component 313 at the carrier frequency $f_C$. When the transmission FBG 304A is tuned, for example by adjusting the grating temperature, the spectrum 400 shifts towards higher or lower frequencies, as shown at 400' and 400". As the spectrum 400 shifts, the first passband 401 and the second passband 402 shift together. When the first passband shifts, the signal 323'at the sidelobe frequency is either passed or attenuated, because the passband 401 is narrow. However, the second passband 402 is wide enough to always pass the carrier component 313. As a result, mixing of the output signal 323', if any, with a signal at the carrier frequency $f_C$ is always available; and tuning of the transmission FBG 304A results in tuning the spectral response function 330 of the filter 300A. Preferably, the passband 401 is tunable by at least 2 GHz, allowing the filter 300A to operate in a 2 GHz wide frequency band, for example between the frequencies of 18 GHz and 20 GHz.

Figure 5:
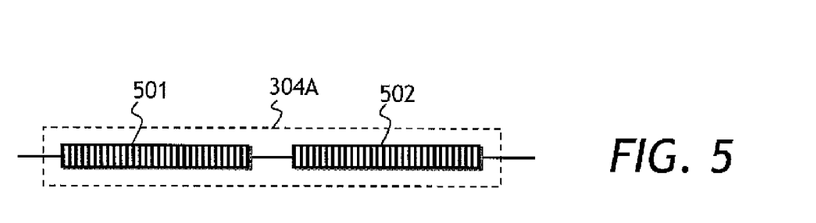
FIG. 5 is a schematic view of a compound FBG shown in FIG. 3.

Referring to FIG. 5, the compound transmission FBG 304A of FIG. 3 is shown in FIG. 5 as consisting of two FBGs 501 and 502 connected in series. Advantageously, having two FBGs 501 and 502 allows both the central frequency and the bandwidth of the filter 300A to be independently tuned, as explained in more detail below.

Figure 6A:
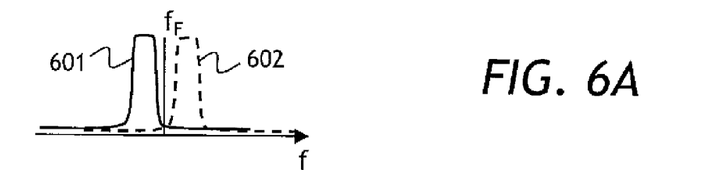
FIGS. 6A to 6C are transmission spectra of FBGs of FIG. 5, illustrating the principle of tuning bandwidth of the passband of the compound FBG of FIG. 3.
Figure 6B:
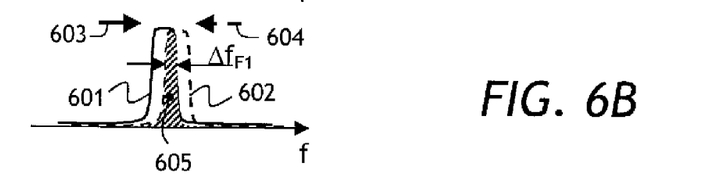
Figure 6C:
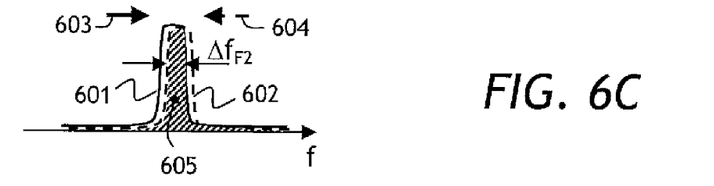

Turning to FIGS. 6A to 6C, transmission bands 601 and 602 of FBGs 501 and 502 are shown, respectively. The purpose of FIGS. 6A to 6C is to illustrate bandwidth tuning of the filter 300A of FIG. 3 by tuning FBGs 501 and 502 of FIG. 5. FBGs 501 and 502 of FIG. 5 may be tuned by tuning the grating temperature or any other suitable grating parameter.

In FIG. 6A, the transmission bands 601 and 602 do not overlap each other, so that there is no passband. In FIG. 6B, the transmission bands 601 and 602 are shifted towards each other as shown by arrows 603 and 604. The transmission bands 601 and 602 form a passband in an overlap region 605 therebetween. The passband is centered at the filter frequency $f_F$ and has a finite bandwidth $\Delta f_{F1}$. In FIG. 6C, the transmission bands 601 and 602 are shifted towards each other even closer than in FIG. 6B, forming a passband having a wider bandwidth $\Delta f_{F2} > \Delta f_{F1}$. Thus, shifting the transmission bands of the FBGs 501 and 502 towards each other or away from each other results in tuning the bandwidth of the filter 300A.

Figure 7A:
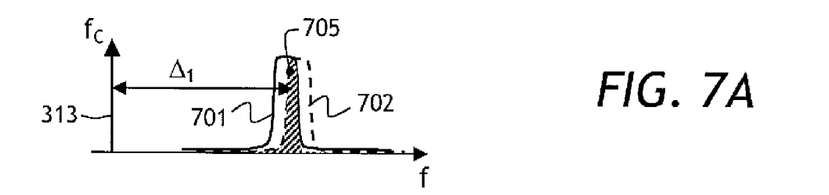
FIGS. 7A to 7C are transmission spectra of FBGs of FIG. 5, illustrating the principle of tuning central frequency of the passband of the compound FBG of FIG. 3.
Figure 7B:
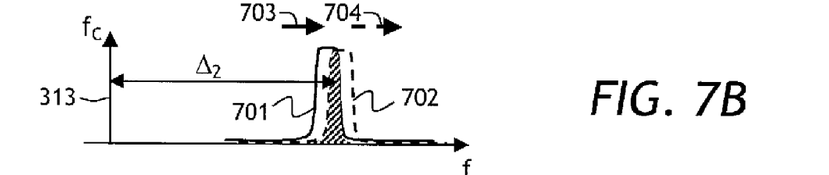
Figure 7C:
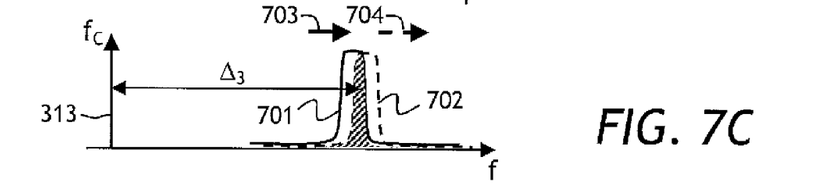

Turning to FIGS. 7A to 7C, transmission bands 701 and 702 of FBGs 501 and 502 are shown, respectively. The purpose of FIGS. 7A to 7C is to illustrate central frequency tuning of the filter 300A of FIG. 3 by tuning FBGs 501 and 502 of FIG. 5.

In FIG. 7A, the transmission bands 701 and 702 form a passband in an overlap region 705 therebetween, shifted from the carrier frequency signal 313 by $\Delta_1$. In FIG. 7B, the transmission bands 701 and 702 are shifted equally towards higher frequencies as shown by arrows 703 and 704. The passband is shifted from the carrier frequency signal 313 by $\Delta_2 > \Delta_1$. In FIG. 7C, the passband is shifted from the carrier frequency signal 313 by $\Delta_3 > \Delta_2 > \Delta_1$. Thus, shifting the transmission bands of the FBGs 501 and 502 in the same direction results in tuning the central frequency of the passband of the filter 300A. It should be noted that both the central frequency and the bandwidth can be tuned together by tuning only one FBG, 501 or 502.

The bandwidth of the passband of the FBG 304A and the roll-off of the passband will strongly affect the filtering characteristics of the filter 300A. The bandwidth will determine the largest possible bandwidth of the filter 300A. The largest bandwidth is reached when the central frequencies of the two FBGs 501 and 502 coincide. Making the FBG bandwidth as large as possible would allow a wide range of bandwidth tuning of the filter 300A. However, a wide passband has the detrimental effect of reducing the filter roll-off of the passband, thus reducing out-of-band attenuation. Increasing the slope of the filter roll-off will limit the narrowest bandwidth of the filter 300A. Narrow-passband FBGs 501 and 502 will have a steeper spectral slope and attenuate out-of-band information more strongly. Therefore, a trade-off exists between the filter bandwidth and the out-of-band rejection. An optimization of the FBG transmission spectrum is required, depending on particular requirements of a specific radio-frequency filter application.

It should be noted that an FBG with a properly selected transmission spectrum can also be used to implement a low-pass or a high-pass microwave filter with variable centre frequency and bandwidth. It should also be noted that the above considerations and principles illustrated in FIGS. 4, 5, 6A to 6C, and 7A to 7C having regard to the transmission FBG 304A used in the filter 300A are also applicable to the reflection FBG 304B used in the filter 300B. In the latter case, proper reflection spectra should be considered instead of the transmission spectra.

Figure 8:
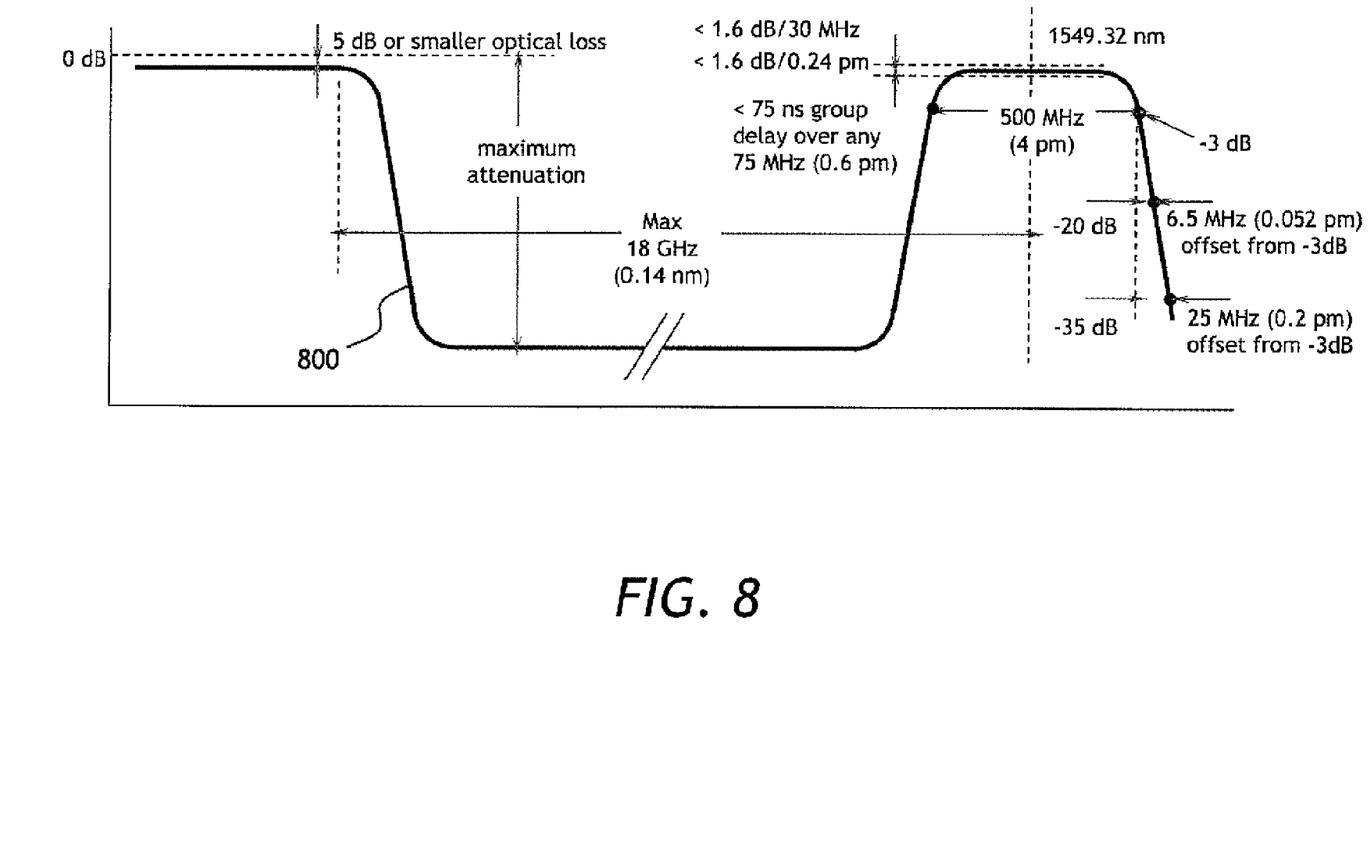
FIG. 8 is an attenuation spectrum illustrating definition of FBG main parameters.

Referring now to FIG. 8, an attenuation spectrum 800 of an FBG used in the present invention, for example the FBG 501 or 502, is shown. The transmission band is defined by a 3 dB bandwidth parameter; a frequency offset at a 20 dB attenuation point relative to a corresponding edge of the 3 dB passband; and a frequency offset at a 35 dB attenuation point relative to a corresponding edge of the 3 dB passband; a ripple value and group delay for the filter passband; and a separation value between carrier and filter passbands. These parameters can be used to specify an FBG suitable for use in a particular radio-frequency filter. The useful ranges of these parameters can be obtained from target specifications of the radio-frequency filter 300A of FIG. 3. FIG. 8 shows an example of filter passband parameters of such a filter. Other filter passband configurations can be easily realized using this invention.

A filter with specifications defined in FIG. 8 can be designed using techniques described by Raman Kashyap in the article entitled "Fiber Bragg Gratings", *Academic Press, ISBN* 0-12-400560-8, 1999, which is incorporated herein by reference. Other techniques known to a person skilled in the art may be used as well.

A tunable filter of the present invention is usable in space subsystems due to wide tunability, low mass, low volume, and low power consumption. However, it should be understood that a tunable filter of the present invention can also be used in other communication systems requiring flexible bandwidth allocation and center frequency tuning. Furthermore, wide tunability of the filter warrants its application as a "set-and-forget" fixed filter, which is tuned once at the factory and shipped to a customer based on the customer's frequency specification.

Further, a filter of the present invention is not intended to only be used for a RF frequency range. For example, a filter using properly selected components can, in principle, be constructed to operate in microwave, mm-wave, terahertz and other frequency ranges.

What is claimed is:

1. A filter for filtering an electrical signal, comprising:
   an optical modulator for receiving light at a carrier frequency and for modulating light at a frequency of the electrical signal to obtain light at first and second frequencies;
   an optical filter for receiving the modulated light and for selecting light at a first frequency to propagate therethrough with at least a fraction of light at the carrier frequency, while suppressing light at the second frequency, the optical filter comprising a dual-band optical filter having a first passband for light at the first frequency and a second passband for light at the carrier frequency; and a photodetector for receiving light filtered by the optical filter and for detecting a signal at a beat frequency between the first frequency and the carrier frequency, wherein the detected signal at the beat frequency comprises an output signal of the filter;

wherein the dual-band optical filter comprise first and second optical sub-filters connected in series, wherein the first and the second optical sub-filters each have and second passbands, wherein the passband of the dual-band optical filter comprises an overlap region between the first passbands of the first and the second optical sub-filters;

wherein the second passband of the dual-band optical filter comprises an overlap region between the second passbands of the first and the second optical sub-filters; and wherein a central frequency and/or a bandwidth of the first passband of the dual-band optical filter is tunable by adjusting a central frequency of the first passband of the first optical sub-filter, of the second optical sub-filter, or of both first and the second optical sub-filters, whereby the filter for filtering the electrical signal is tunable in frequency and/or bandwidth.

2. The filter of claim 1, further comprising a light source for providing light at the carrier frequency.

3. The filter of claim 2, wherein the light source is a laser.

4. The filter of claim 1, wherein the first optical sub-filter comprises a first fiber Bragg grating having a transmission band corresponding to the first passband of the first optical sub-filter.

5. The filter of claim 4, wherein the second optical sub-filter further comprises a second fiber Bragg grating coupled to the first fiber Bragg grating, the second fiber Bragg grating having a transmission band corresponding to the first passband of the second optical sub-filter.

6. The filter of claim 5, wherein the first fiber Bragg grating is tunable, whereby the bandwidth of the first passband of the dual-band filter is tunable.

7. The filter of claim 4, wherein the first fiber Bragg grating is tunable, whereby the central frequency of the first passband of the dual-band optical filter is tunable.

8. The filter of claim 1, wherein the optical filter includes a notch filter for attenuating light at a third frequency different from the first frequency and second frequencies.

9. The filter of claim 1, wherein the optical modulator and the optical filter are coupled by an optical waveguide.

10. The filter of claim 2, wherein the light source, the optical modulator, the filter, and the photodetector are coupled by an optical waveguide.

11. The filter of claim 10, wherein the optical waveguide is an optical fiber.

* * * * *